US010330768B2

(12) United States Patent
Macuha

(10) Patent No.: US 10,330,768 B2
(45) Date of Patent: Jun. 25, 2019

(54) METHOD IMPLEMENTED BY A MOBILE DEVICE FOR OBTAINING ITS POSITION AND DEVICE IMPLEMENTING THIS METHOD

(71) Applicant: ORANGE, Paris (FR)

(72) Inventor: Martin Macuha, Bratislava (SK)

(73) Assignee: Orange, Paris (FR)

( * ) Notice: Subject to any disclaimer, the term of this patent is extended or adjusted under 35 U.S.C. 154(b) by 369 days.

(21) Appl. No.: 15/100,939

(22) PCT Filed: Nov. 28, 2014

(86) PCT No.: PCT/IB2014/002918
§ 371 (c)(1),
(2) Date: Jun. 1, 2016

(87) PCT Pub. No.: WO2015/082996
PCT Pub. Date: Jun. 11, 2015

(65) Prior Publication Data
US 2016/0299211 A1    Oct. 13, 2016

(30) Foreign Application Priority Data

Dec. 3, 2013  (EP) .................................. 13306657

(51) Int. Cl.
*G01S 5/02*    (2010.01)
(52) U.S. Cl.
CPC .......... *G01S 5/0294* (2013.01); *G01S 5/0263* (2013.01); *G01S 5/0268* (2013.01)
(58) Field of Classification Search
CPC ....... G01S 5/0294; G01S 5/0257–0268; G01S 19/47; G01S 19/49
See application file for complete search history.

(56) References Cited

U.S. PATENT DOCUMENTS 5,452,211 A * 9/1995 Kyrtsos .................. G01C 21/26
                                                    342/357.24
9,244,152 B1 * 1/2016 Thiagarajan .............. G01S 5/10
(Continued)

FOREIGN PATENT DOCUMENTS

JP    08340570 A  * 12/1996

OTHER PUBLICATIONS

E. Abbott et al., Land-Vehicle Navigation Using GPS, Proceedings of the IEEE, vol. 87(1), p. 145-162, Jan. 1999 (Year: 1999).*
(Continued)

*Primary Examiner* — Bernarr E Gregory
*Assistant Examiner* — Fred H Mull
(74) *Attorney, Agent, or Firm* — Haverstock & Owens LLP

(57) ABSTRACT

A method, system and device for obtaining the position of a mobile device. The method including determining a current set of possible positions of the mobile device from a distance between the mobile device and an anchor device at a current instant; determining a subsequent set of possible positions at a subsequent instant from the current set of possible positions and from a vector of movement of the mobile device at the instant; estimating the distance between the mobile device and the anchor device at the subsequent instant; obtaining a new current set of possible positions of the mobile device by selecting within the subsequent positions those which are, from the anchor device, at the distance estimated at the estimating step; and repeating the last three steps until the new current set of possible positions includes only one element.

19 Claims, 3 Drawing Sheets

(56) References Cited

U.S. PATENT DOCUMENTS

2006/0267841 A1* 11/2006 Lee ................. G01S 5/0081
                                              342/463
2012/0289243 A1* 11/2012 Tarlow ............. G01S 5/0072
                                              455/456.1
2013/0029685 A1    1/2013 Moshfeghi

OTHER PUBLICATIONS

English Translation of JP 08340570 A (Year: 1996).*
Prem Kumar B., "A Survey of Positioning Algorithms on Mobile Devices in Location Based Services", International Journal of Advanced Research in Computer Science and Software Engineering, vol. 3, Issue 6, Jun. 2013, ISSN: 2277 128X, pp. 1779-1784.
The International Search Report for the PCT/IB2014/002918.

* cited by examiner

METHOD IMPLEMENTED BY A MOBILE DEVICE FOR OBTAINING ITS POSITION AND DEVICE IMPLEMENTING THIS METHOD

BACKGROUND OF THE INVENTION

This invention relates to a method enabling a device, for example a smartphone, to determine its own position.

With the developing of telecommunications, many solutions for tracking a mobile device have been proposed. The location information reported by such solutions are used in providing position-based services such as emergency rescue, locating a shop, searching for missing people, etc.

The GPS (Global Positioning System) technology uses information sent from GPS satellites. Such a technology requires a GPS receiver to be embedded in a mobile device to be tracked. One of the drawbacks of this technology is its cost relatively to precision of the location information reported. Indeed, the more precise the location information the more expansive the GPS receiver.

Another method for tracking the location of a mobile device is the triangulation technology. A mobile device receives signals from at least three base stations, and determines its relative location with respect to each of these three base stations using each base station coordinates and signal emitting time.

Such a method requires precise time synchronization between the base stations and the mobile device.

In order to overcome these deficiencies, methods for tracking the position of a mobile device using only one base station have been proposed.

U.S. Pat. No. 6,300,905 discloses a method for tracking the location of a mobile device using CDMA (Code Division Multiple Access) and TDMA (Time Division Multiple Access) systems. In the method disclosed, the base station measures the mobile device radio frequency forward link signal and the propagation-delay time to calculate the distance between the mobile device and the base station, and utilizes at least three multiple sector antennas to measure the mobile device's azimuth angle.

However, such a method does not provide precise location information of the mobile device because the resolution and precision of the measurement depend on the number of antennas used.

SUMMARY OF THE INVENTION

According to a first aspect, the invention concerns a method implemented by a mobile device for obtaining its position, said method comprising the steps of:
  a. determining a current set of possible positions of this device from a measure of the distance between said device and an anchor device at a current instant;
  b. determining a subsequent set of possible positions at a subsequent instant from said current set and from a vector of movement of said device at said current instant;
  c. estimating the distance between said device and said anchor device at said subsequent instant;
  d. obtaining a new current set of possible positions of said device by selecting within said subsequent set of possible positions those which are at said distance from said anchor device;
repeating steps b. to d. until said current set comprises only one element and estimating that the position of said device is this element.

The invention concerns also a device comprising:
  a module for determining a current set of possible positions of this device a measure of the distance between said device and an anchor device at a current instant;
  a control module for activating, as long as said current set comprises more than one element:
    a module for obtaining a vector of movement of the device;
    a module for determining a subsequent set of possible positions of this device at a subsequent instant from said current set and from a vector of movement of said device at said current instant;
    a module for obtaining a new current set of possible positions of said device, this module having means for estimating the distance between said device to said anchor device at said subsequent instant and for selecting within said subsequent set of possible positions those which are at said distance from said anchor device;
  said control module being configured to estimate that the position of said device is the element of said current set when said current set comprises only one element.

The invention therefore provides a very simple and cheap allows solution for determination the position of a device, the method neither requiring the use of a GPS receiver nor the use of several sector antennas.

The solution of the invention is also very simple to implement from a system point of view, since it requires only one anchor device.

The device of the invention may for example be a smartphone.

In one embodiment, the method of the invention comprises a step of obtaining the position information of said anchor device in periodic manner, said position being broadcast by said anchor device.

In another embodiment, the method of the invention comprises a step of requesting the position information of said anchor device to said anchor device.

In one embodiment of the invention, the distance is estimated using the strength of a signal received from said anchor device and the time and transmitted power of said signal by said anchor device.

In one embodiment of the invention, the device determines the vector of movement using sensors employing earth's magnetic field measurements and motion detection.

In one embodiment of the invention, the module for obtaining a vector of movement of the device comprises at least one sensor among an accelerometer, a gyroscope and a compass sensors.

In a preferred implementation, the steps of the management method are determined by computer program instructions.

Consequently, the invention is also directed to a computer program on an information medium, adapted to be executed in a computer, and including instructions for implementing the above management method.

This program can use any programming language and take the form of source code, object code or an intermediate code between source code and object code, such as a partially compiled form, or any other desirable form.

The invention is also directed to a computer readable information medium containing instructions of the above computer program.

The information medium can be any entity or device capable of storing the program. For example, it can include storage means such as a ROM, for example a CD ROM or a microelectronic circuit ROM, or magnetic storage means, for example a diskette (floppy disk) or a hard disk.

Moreover, the information medium can be a transmissible medium such as an electrical or optical signal which can be routed via an electrical or optical cable, by radio or by other means. The program according to the invention can in particular be downloaded over an Internet type network.

Alternatively, the information medium can be an integrated circuit incorporating the program and adapted to execute the method in question or to be used in its execution.

BRIEF DESCRIPTION OF THE DRAWINGS

Other characteristics and advantages of the invention will be described in reference to FIGS. 1 to 3 in which.

DETAILED DESCRIPTION OF ONE EMBODIMENT

In this detailed description, we consider a smartphone or device A which moves in the vicinity of an anchor device B, devices A and B having the possibility to communicate using Wi-Fi technology.

At step E10 (t=t0), device A obtains the absolute position in Earth of anchor device B.

In this embodiment, anchor device B broadcasts its position in periodic manner, during a Wi-Fi discovery procedure.

In another embodiment, anchor device B provides its position to device A upon reception of a specific request received from device A.

At step E20 (t=t0), device A determines a measure D0 of its distance to anchor device B.

In this embodiment, this measure is estimated by device A using the strength of a signal received from anchor device B and the time and transmitted power of said signal by anchor device B.

Figure 1:
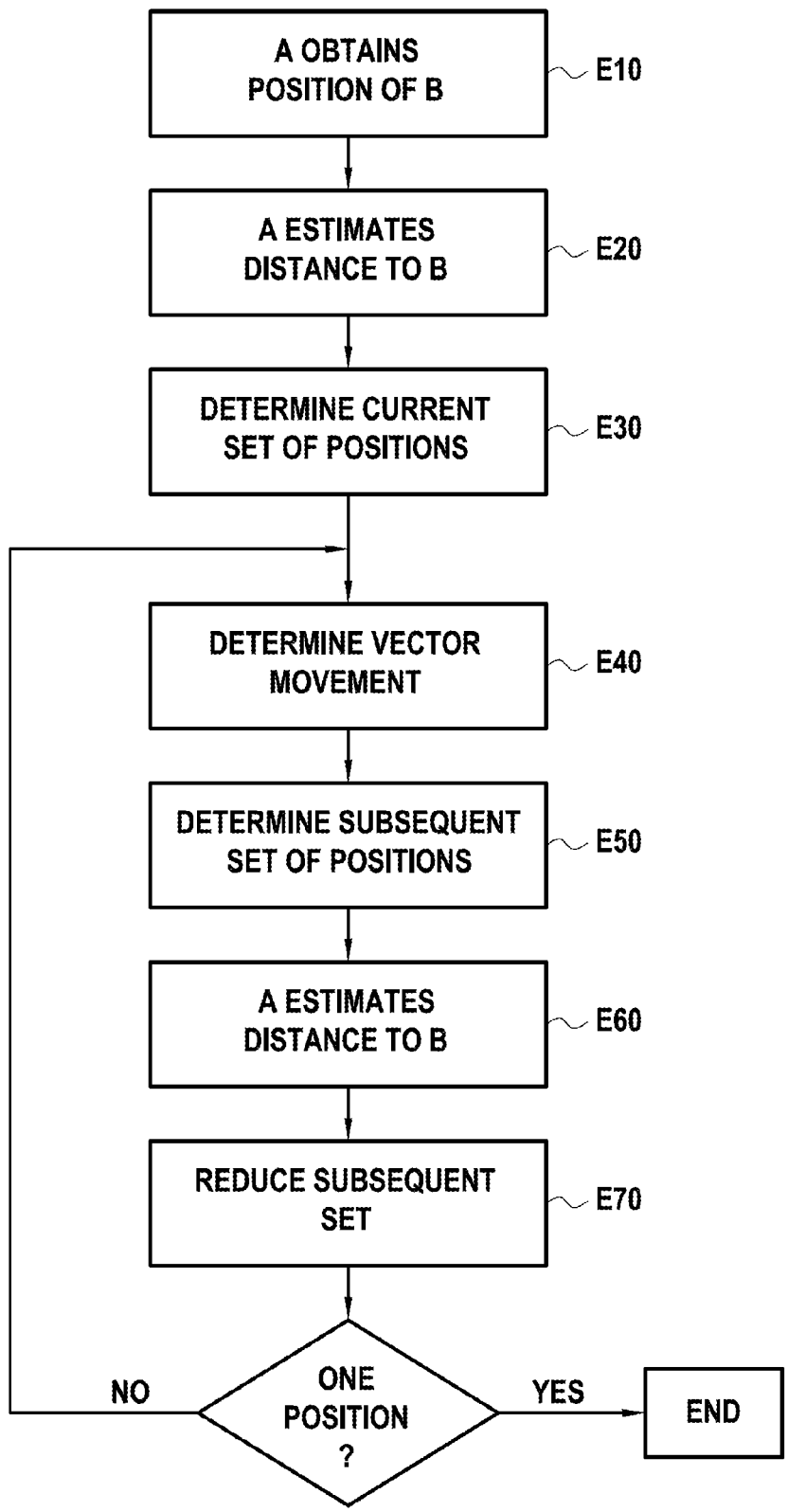
FIG. 1 represent in the form of a flow chart, the main steps of a method for determining the position of a device according to a specific embodiment of the invention.
Figure 2A:
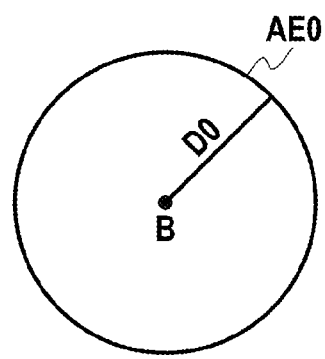
FIGS. 2A to 2E present, in an Euclidian 2D space, the determination of the position of a device in a specific example.

At step E30 (t=t0), device A determines a set AE0 of its possible positions from this measure D0. As shown FIG. 2A, this first set AE0 is the circle of center B and radius D0.

At step E40 (t=t0), device A estimates a vector of its movement, i.e. a distance and direction of its movement during a short period of time.

In this embodiment, device A determines said distance and direction using sensors employing earth's magnetic field measurements and motion detection. In particular, device A measures own travelled distance over a given interval and the angle with respect to the Earth coordinate system (azimuth).

For example, device A stores a relative initial position (i.e. local coordinates Lx,Ly,Lz) and, at periodical intervals during a given period of time, utilizes sensors to detect its own vertical/horizontal position change as well as position change with respect to the azimuth. The accuracy of these values depends on many factors, such as sensor mechanics and sensitivity, rounding, initial position of the device, etc.

Figure 2B:
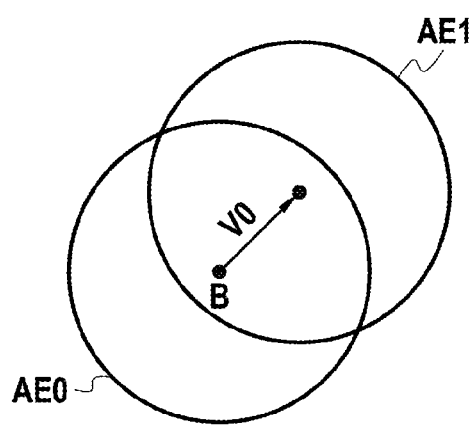

At step E50 (t=t0), device A determines a subsequent set of its possible positions AE1 at a subsequent instant t1 from said set AE0 and from said vector of movement V0, as shown FIG. 2B. In other device A determines at t=t0, the positions in which it is likely to be at a subsequent instant t1, from its possible positions at t=t0 and its vector of movement V0 at t=t0.

At step E60, device A determines a measure D1 of its distance to anchor device B when said current instant becomes said subsequent instant, i.e. at t=t1.

Figure 2C:
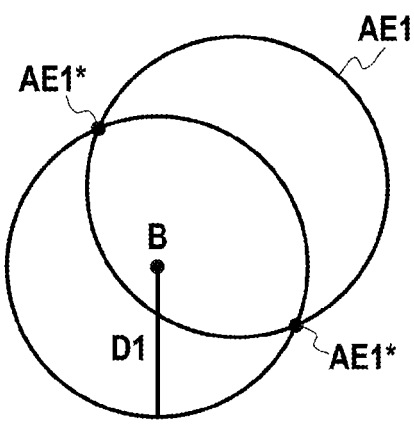

At step E70 (t=t1), device A obtains a new current set of possible positions AE1* by selecting within the subsequent set AE1 those which are at distance D1 from anchor device B. As shown FIG. 2C, the new current set AE1* comprises two positions AE1* at the intersection of set AE1 with the circle of center B and radius D1.

At step E80 (t=t1), device A determines whether said current set AE1* comprises more than one element.

If yes, step E80 is followed by step E40, where device A determines, at time current time t1, its vector of movement V1.

Figure 2D:
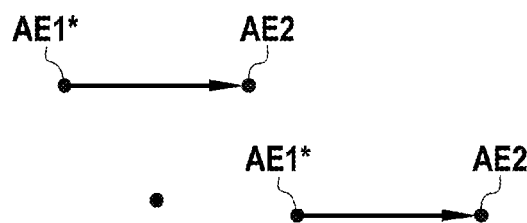

At step E50 (t=t1), device A determines a subsequent set of its possible positions AE2 at a subsequent instant t2 from said set AE1* and from said vector of movement V1, as shown FIG. 2D. In other device A determines at t=t1, the positions in which it is likely to be at a subsequent instant t2, from its possible positions at t=t1 and its vector of movement V1 at t=t1.

At step E60, device A determines a measure D2 of its distance to anchor device B when said subsequent instant t2 becomes said current instant; ie at t=t2.

Figure 2E:
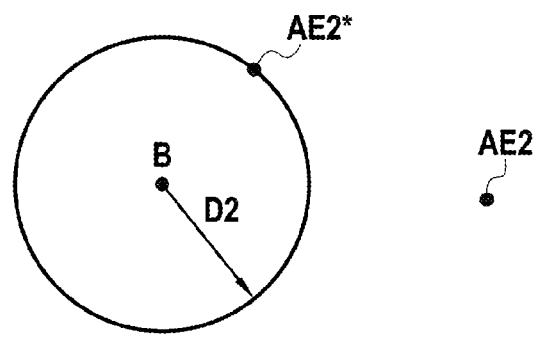

At step E70 (t=t2), device A obtains a new current set of possible positions AE2* by selecting within the subsequent set AE2 those which are at distance D2 from anchor device B. As shown FIG. 2E, the new current set AE2* comprises only one position on the circle of center B and radius D2.

At step E80 (t=t2), device A determines that current set AE2* comprises only one position.

The current position of device A is therefore considered to be this position.

Device A can recalculate this its own current position in the Earth spherical coordinate system, knowing its relative position to the anchor device B and the position of anchor device B in the Earth spherical coordinate system.

For sake of clarity, the invention was presented in the context of Euclidean 2D situation, but the invention applies similarly in an Euclidean 3D space.

Figure 3:
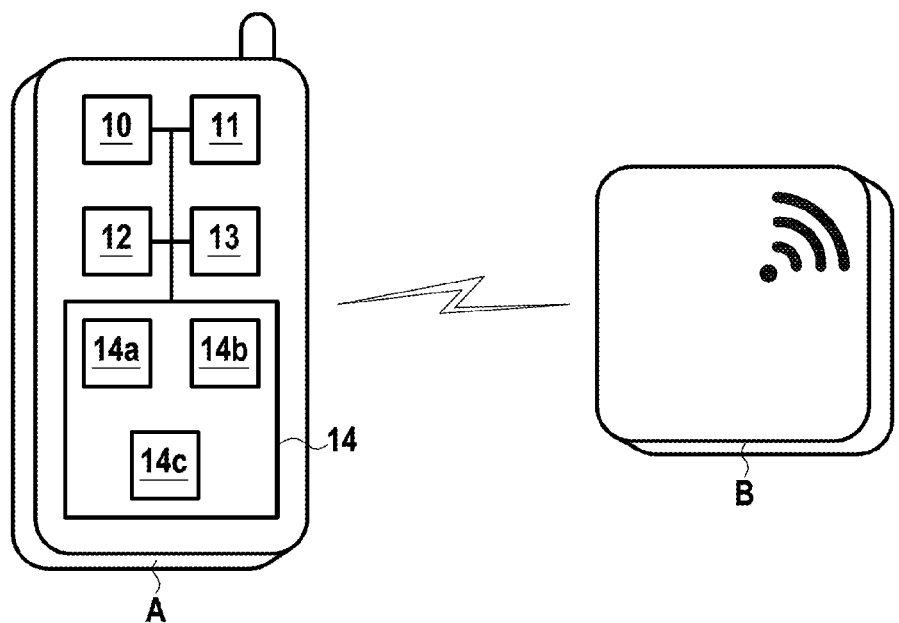
FIG. 3 represent schematically a device according to a specific embodiment of the invention.

FIG. 3 represents a device, more particularly, a smartphone A according to a particular embodiment of the invention.

In this particular embodiment, this smartphone comprises a processor 10, Wi-Fi communication means 11, a RAM volatile memory 12 and a non-volatile memory 13, for example a Read-Only memory or a flash memory.

The non-volatile memory 13 is a recording medium according to the invention. It can be read by processor 10. It records a computer program according to the invention, this program comprising instructions for executing the steps E10 to E80 described above in reference to FIG. 2 enabling the smartphone A to determine its position of obtaining the position knowing the position of anchor device B.

Device A comprises a module for obtaining a vector of movement of said device. In this embodiment, this module 14 comprises several sensors including an accelerometer 14a, a gyroscope 14b and a compass 14c.

In this embodiment, Wi_Fi module 11 is used to receive the position of anchor device B and to evaluate the distance between device A and anchor device B.

Processor 10, when executing the computer program of the invention, constitutes a module for determining the possible positions of the device A using the vector of movement of device A and the distance to the anchor device B as explained above.

The invention claimed is:

1. A method implemented by a mobile device for obtaining its position, said method comprising:
  a. determining a current set of possible positions of the mobile device from a measure of a distance between the mobile device and an anchor device at a current instant t0;
  b. determining a subsequent set of possible positions of the mobile device at a subsequent instant t1 from only the current set of possible positions and a vector of movement of the mobile device at the instant t0;
  c. estimating the distance between the mobile device and the anchor device at the subsequent instant t1;
  d. obtaining a new current set of possible positions of the mobile device by selecting within the subsequent set of possible positions those which are at the estimated distance from the anchor device;
  e. repeating steps b. to d. until the new current set of possible positions comprises only one element;
  f. estimating that the position of the mobile device is the only one element; and
  g. providing a position-based service with the mobile device using the estimated position of the mobile device.

2. The method of claim 1, comprising obtaining position information of the anchor device in a periodic manner, the position information being broadcast by the anchor device.

3. The method of claim 1, comprising requesting position information of the anchor device from the anchor device.

4. The method of claim 1, wherein the measure of the distance between the mobile device and the anchor device is estimated using the strength of a signal received from the anchor device and the time of transmission and transmitted power of the signal by the anchor device.

5. The method of claim 1, further comprising determining the vector of movement of the mobile device using sensors employing earth's magnetic field measurements and motion detection.

6. The method of claim 1, comprising determining the vector of movement of the mobile device using at least one sensor among an accelerometer, a gyroscope, and a compass sensor.

7. The method of claim 1, wherein the mobile device is a smartphone.

8. A device comprising:
  a non-transitory computer-readable memory storing instructions; and
  a processor, upon executing the instructions, configured to:
  a. determine a current set of possible positions of the device from a measure of a distance between the device and an anchor device at a current instant t0;
  b. determine a subsequent set of possible positions of the device at a subsequent instant t1 from only the current set of possible positions and a vector of movement of the device at the instant t0;
  c. estimate the distance between the mobile device and the anchor device at the subsequent instant t1;
  d. obtain a new current set of possible positions of the device by selecting within the subsequent set of possible positions those which are at the estimated distance from the anchor device;
  e. repeat steps b. to d. until the new current set of possible positions comprises only one element;
  f. estimate that the position of the device is the only one element; and
  g. provide a position-based service using the estimated position of the mobile device.

9. The device according to claim 8, wherein the processor, upon executing the instructions, is configured to determine the vector of movement of the device using at least one sensor among an accelerometer, a gyroscope and a compass sensor.

10. The device according to claim 8 characterized in that the device is a smartphone.

11. The device of claim 8, wherein the processor, upon executing the instructions, is configured to obtain position information of the anchor device in a periodic manner, said position information being broadcast by the anchor device.

12. The device of claim 8, wherein the measure of the distance between the mobile device and the anchor device is estimated using the strength of a signal received from the anchor device and the time of transmission and transmitted power of said signal by the anchor device.

13. The device of claim 8, wherein the processor, upon executing the instructions, is configured to determine the vector of movement of the mobile device using sensors employing earth's magnetic field measurements and motion detection.

14. A non-transitory computer readable medium storing instructions that, when executed by a processor, configure the processor to:
  a. determine a current set of possible positions of a device from a measure of a distance between the device and an anchor device at a current instant t0;
  b. determine a subsequent set of possible positions of the device at a subsequent instant t1 from only the current set of possible positions and a vector of movement of the device at the instant t0;
  c. estimate the distance between the mobile device and the anchor device at the subsequent instant t1;
  d. obtain a new current set of possible positions of the device by selecting within the subsequent set of possible positions those which are at the estimated distance from the anchor device;
  e. repeat steps b. to d. until the new current set of possible positions comprises only one element;
  f. estimate that the position of the device is the only one element; and
  g. provide a position-based service using the estimated position of the mobile device.

15. The non-transitory computer readable medium of claim 14, wherein the instructions, when executed by the processor, configure the processor to determine the vector of movement of the mobile device using at least one sensor among an accelerometer, a gyroscope, and a compass sensor.

16. The non-transitory computer readable medium of claim 14, wherein the device is a smartphone.

17. The non-transitory computer readable medium of claim 14, wherein the instructions, when executed by the processor, configure the processor to obtain position information of the anchor device in a periodic manner, said position information being broadcast by the anchor device.

18. The non-transitory computer readable medium of claim 14, wherein the measure of the distance between the mobile device and the anchor device is estimated using the strength of a signal received from the anchor device and the time of transmission and transmitted power of said signal by the anchor device.

19. The non-transitory computer readable medium of claim 14, wherein the instructions, when executed by the processor, configure the processor to determine the vector of movement of the mobile device using sensors employing earth's magnetic field measurements and motion detection.

\* \* \* \* \*